(12) United States Patent
Soulvie

(10) Patent No.: US 7,390,130 B2
(45) Date of Patent: Jun. 24, 2008

(54) CAMERA SUPPORT BASE

(76) Inventor: John Soulvie, 345 S. Irving Ave., Tucson, AZ (US) 85711

( * ) Notice: Subject to any disclaimer, the term of this patent is extended or adjusted under 35 U.S.C. 154(b) by 318 days.

(21) Appl. No.: 11/246,533

(22) Filed: Oct. 11, 2005

(65) Prior Publication Data

US 2007/0081817 A1    Apr. 12, 2007

(51) Int. Cl.
G03B 17/00 (2006.01)
H04N 5/225 (2006.01)
(52) U.S. Cl. .................. 396/419; 348/373; 348/375; 348/376; D16/242; D16/243
(58) Field of Classification Search ............... 396/419; 348/373, 375, 376; D16/239, 242–243
See application file for complete search history.

(56) References Cited

U.S. PATENT DOCUMENTS

| 3,704,848 | A | * | 12/1972 | Trebes et al. ............. 248/163.1 |
| 3,833,916 | A | * | 9/1974 | Van Der Meer ............. 396/419 |
| 4,027,318 | A | | 5/1977 | Knapp |
| 4,138,079 | A | | 2/1979 | Ehret et al. |
| 4,648,698 | A | * | 3/1987 | Iwasaki ................. 248/163.1 |
| 4,870,440 | A | | 9/1989 | Frost |
| 4,899,189 | A | | 2/1990 | Frost |
| D307,286 | S | * | 4/1990 | Ginder .................. D16/242 |
| 5,027,141 | A | * | 6/1991 | Bowers .................. 396/419 |
| 5,040,759 | A | * | 8/1991 | Wainwright ............. 248/186.2 |
| 5,350,147 | A | | 9/1994 | Paganus |
| 5,528,325 | A | | 6/1996 | Perez |
| 5,810,313 | A | | 9/1998 | Armstrong |
| 6,042,277 | A | * | 3/2000 | Errington ................ 396/419 |
| 6,073,902 | A | | 6/2000 | Hiles |
| 6,439,530 | B1 | | 8/2002 | Schoenfish et al. |

(Continued)

FOREIGN PATENT DOCUMENTS

JP    8-95141    4/1996

(Continued)

OTHER PUBLICATIONS

"Stroboframe Pro-RL Bracket," Tiffen, http://www.tiffen.com/Stroboframe_ProRL_page.htm, 3 pages, printed from the Internet on Jan. 20, 2005 (Best copy available).

(Continued)

*Primary Examiner*—W. B. Perkey
*Assistant Examiner*—Andrew Williams
(74) *Attorney, Agent, or Firm*—Richard C. Litman

(57) ABSTRACT

The camera support base of the invention is designed to meet the need for a stable, lightweight, compact, economical fixture that can be removably affixed to a photographic camera to safely support the camera when it is set down out-of-hand. A preferred basic design of the camera support base comprises a three legged device that assumes the overall general shape of a "T", having a flat horizontal top portion or plate bisected by a flat perpendicular vertical portion in the same plane. The widths of the top portion and the vertical portion can be the same or different with a width wide enough at the juncture of the two portions to assure contact with the bottom part of a camera sufficient to support the camera and secure it to the base.

19 Claims, 6 Drawing Sheets

U.S. PATENT DOCUMENTS

D470,527 S     2/2003   Oliver et al.
6,776,539 B2   8/2004   Mulcahey

FOREIGN PATENT DOCUMENTS

JP     10-68994     3/1998

OTHER PUBLICATIONS

"Sunpak Mini Flat Tripod," B&H, http://www.bhphotovideo.com/bnh/controller/home?A=details&kw=SUMF&is=REG&O=&O=productlist&sku=272488, 2 pages, printed from the Internet on Jan. 20, 2005.

"Digital Camera Accessory—Mini Wire Tripod," B&G Sales International, http://www.bgsales.com/Digital_Camera_Accessories/wire-tripod.html, 2 pages, printed from the Internet on Jan. 20, 2005.

* cited by examiner

CAMERA SUPPORT BASE

BACKGROUND OF THE INVENTION

1. Field of the Invention

The present invention relates to a removable base to securely attach to and support a photographic camera that prevents the camera from tipping or falling with consequential damage when not in use.

2. Description of the Related Art

Candid camera enthusiasts, both hobbyists and professionals, have long felt the need for a means to support and protect their camera when it has been put aside for a moment to attend to other equipment or subject matters. When out of the hands of the photographer, the shape of most cameras produces an uneven distribution in weight, which enhances the tendency for the camera to tip over or roll over, even when laid on flat surfaces. Often, damage to the camera, particularly the lens, can result. In the world of camera equipment there are support bases of many types, especially the ubiquitous tripod, that can adjust to different heights and safely secure the camera in most instances. But these base supports are bulky, expensive, or just unable to serve the needs of a casual, momentary, camera set aside by the photographer. Were a camera always attached to a tripod, there would be no need for any additional base. However, even when the camera is attached to a tripod, the camera frequently must be laid out-of-hand during a photographic session. Just as frequently, the camera, especially high end cameras, are usually supporting several attachments, such as flash equipment, telescopic lens and the like, that make the camera an awkward ensemble and vulnerable to accidental damage if laid aside without extra care.

While there is a need for a light, unobtrusive, inexpensive and convenient camera support base to overcome the foregoing problems, a successful camera support base must also be able to accommodate a wide variety of camera brands, types, shapes and sizes. Photographers, particularly hobbyists and professionals, often carry more than one type of camera with them, plus assorted attachments. It is impracticable for them to also carry camera support bases specifically designed for every situation. It is more preferable, by far, for a single camera support base to be adaptable as a support for a wide range of photographic equipment.

Referring to U.S. Pat. No. 6,776,539, a camera bracket is described for use with a camera and flash unit. The bracket has a base support member and a vertical support member configured to accommodate and engage with a flash unit. The bracket has a handle member to support the bracket that allows the photographer to support the assembly to take a horizontal photograph. The bracket of the patent is large and intended to aid in the support and use of a flash unit.

The above patent fails to describe the instant invention as claimed. Thus, a camera support base solving the aforementioned problems is desired.

SUMMARY OF THE INVENTION

The camera support base of the instant invention is designed to meet the need for a stable, lightweight, compact, economical fixture or support that can be removably affixed with ease to a photographic camera in order to safely support the camera when it is set down out-of-hand beyond the control of the photographer.

The camera support base of the invention is preferably manufactured from aluminum or engineered plastics, such as Acrylonitrile-Butadiene-Styrofoam (ABS) plastic; polyoxymethylene plastics, such as Delrin™ (a product of E. I. du Pont de Nemours) or Celcon™ (a product of the Celanese Corporation of America); polycarbonates, such as Lexan™ (a product of du Pont); and polyethylene terephthalate. Depending on the expected service duty, such plastics as polyvinyl chloride (PVC) and polyethylene can also be used. Using any of these plastic resins, the design of the camera support base of the invention lends itself to economical production by injection molding in a variety of models.

Depending on the duty circumstances, metals such as aluminum formed into sheets can also be used as the material of construction.

A preferred basic design of a camera support base comprises a three-legged device that assumes the overall general shape of a "T", having a flat horizontal top portion bisected by a flat perpendicular vertical portion. The widths of the top portion and the vertical portion can be the same or different, but must present a width wide enough at the juncture of the two portions to assure contact with the bottom part of a camera sufficient to support the camera.

In one preferred mode, the tip end of the vertical portion is biased downward at about a 45° angle to form a broad leg, while at least two broad legs are formed at the outer running edge of the top portion, one at each opposing end of the top portion, to raise the bottom of the base in an amount comparable to the elevation provided by the biased tip end. The camera support base is preferably designed for the center of gravity of the camera to rest at the intersection of the top and vertical portions.

To broaden the applicability and compatibility of the camera support base of the invention with as many models of cameras as possible, the top portion of the base contains a number of slots and apertures, some threaded, to accommodate connecting as many models as possible to the base. Some slots run with the direction of the length of the top portion, while in other models the slots run with the width of the top portion. The slots are wide enough to accommodate a threaded bolt.

Most high-end cameras of the type used by photography hobbyists or professionals are manufactured with a threaded socket and matching threaded bolt installed in the bottom mid-portion of the camera. The socket and bolt are used to attach the camera to a tripod or connect the camera to a flash unit. In the camera support base of the present invention, a threaded or unthreaded socket may be installed in a mid-portion of the cross section of the base that can utilize the socket and bolt of the camera to attach the base of the invention to the camera as a support means.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
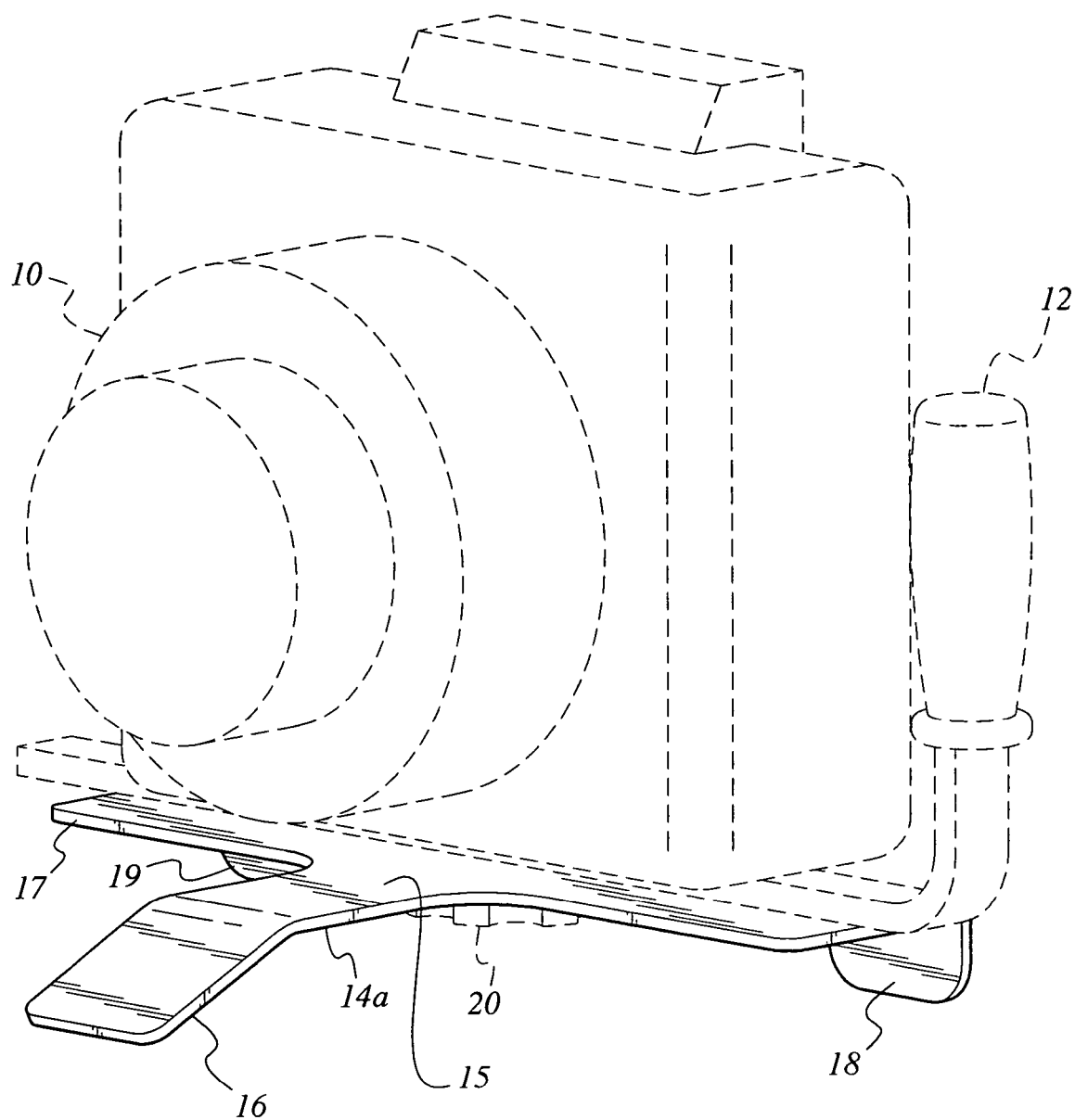
FIG. 1 is an environmental perspective view of a camera support base according to the present invention.

Referring to FIG. 1, a view is presented of the camera support base 14a of the invention supporting a camera 10 and a camera attachment 12. The base 14a is preferably shaped as a "T" with at least three legs to support the base. Two supports or legs 18, 19 are at opposing ends of the cross member 17 or plate of the T, and a third support or leg 16 is at the end of a shaft 15 extending from the cross member 17 of the T, forming a continuous part thereof. The cross member 17 and the shaft 15 intersect in the same plane. Preferably, third leg 16 is formed by biasing the distal section of the shaft 15 of the T at about a 45° angle. The camera 10 is attached to the camera support base 14a by threaded bolt 20 through an aperture in the camera support base 14a.

Figure 2:
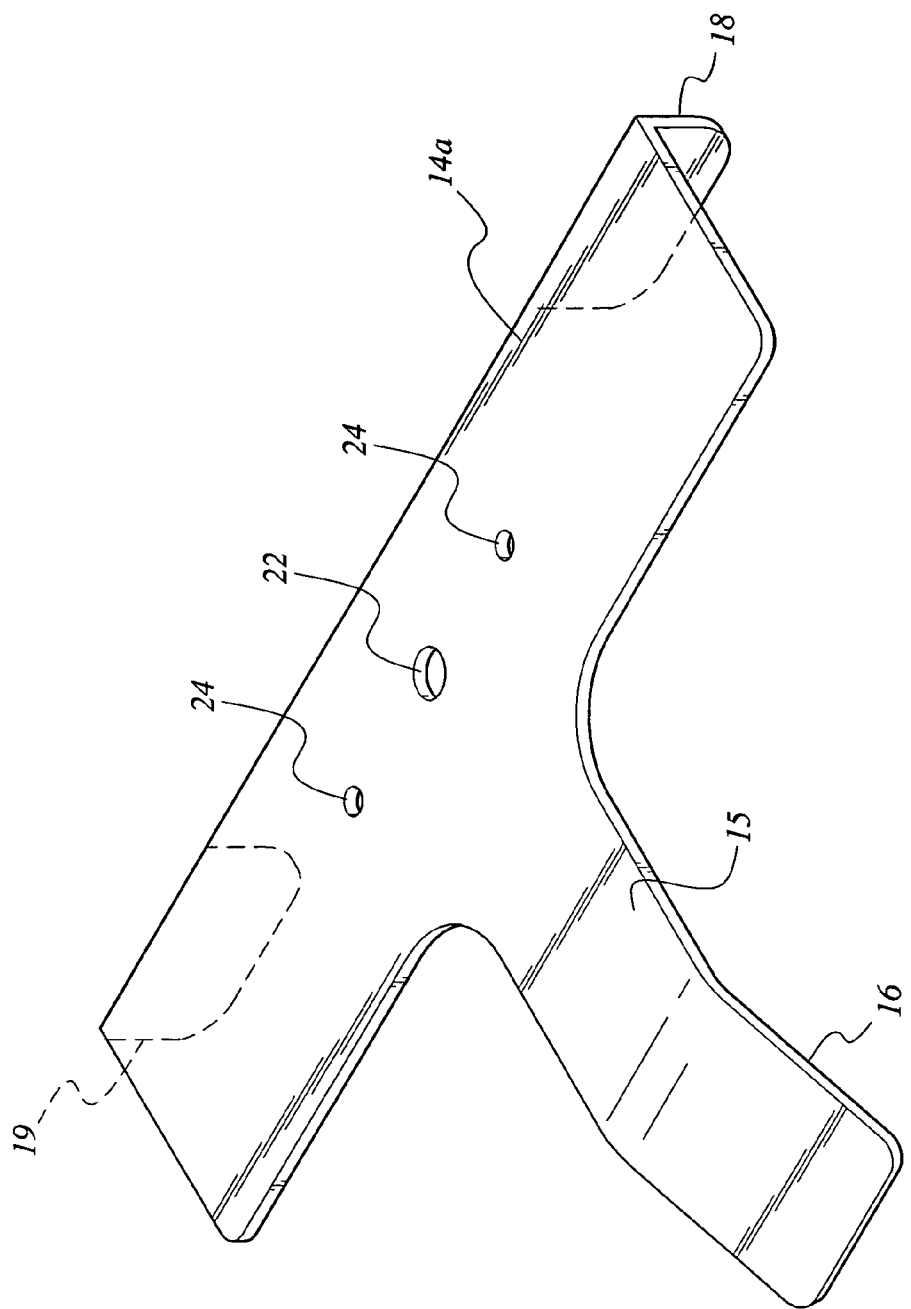
FIG. 2 is a perspective view of a first embodiment of a camera support base according to the present invention.

Referring to FIG. 2, the preferred camera support base 14a of the present invention is illustrated as a T-shaped body having apertures that may be unthreaded apertures 24 or threaded apertures 22 defined through the midsection of the cross member 17 or plate of the T to provide a means to attach the camera support base 14a to a camera. The support members 18 and 19 are shown extending downwardly from the side edge of the cross member 17. They, along with the third support member or leg 16 on the shaft 15, raise the camera to a continuous height. Preferably, the cross section member 17 of the base is about one and one-quarter inches in width and the shaft 15 is about one inch in width; although, this width can vary substantially without disturbing the function of the camera support base 14a. While it is preferred that the opposing leg cross members 18 and 19 have a width of about one-half inch each, these supports can be significantly wider without disturbing the function of the camera support base. The camera support base 14a is shown in the drawings as being made from a single, flat, monolithic plate bent, molded, cast, forged, or otherwise formed with legs 18 and 19 substantially normal to the cross member 17 and leg 16 sloping forward from the shaft 15 at an oblique or acute angle.

Figure 3:
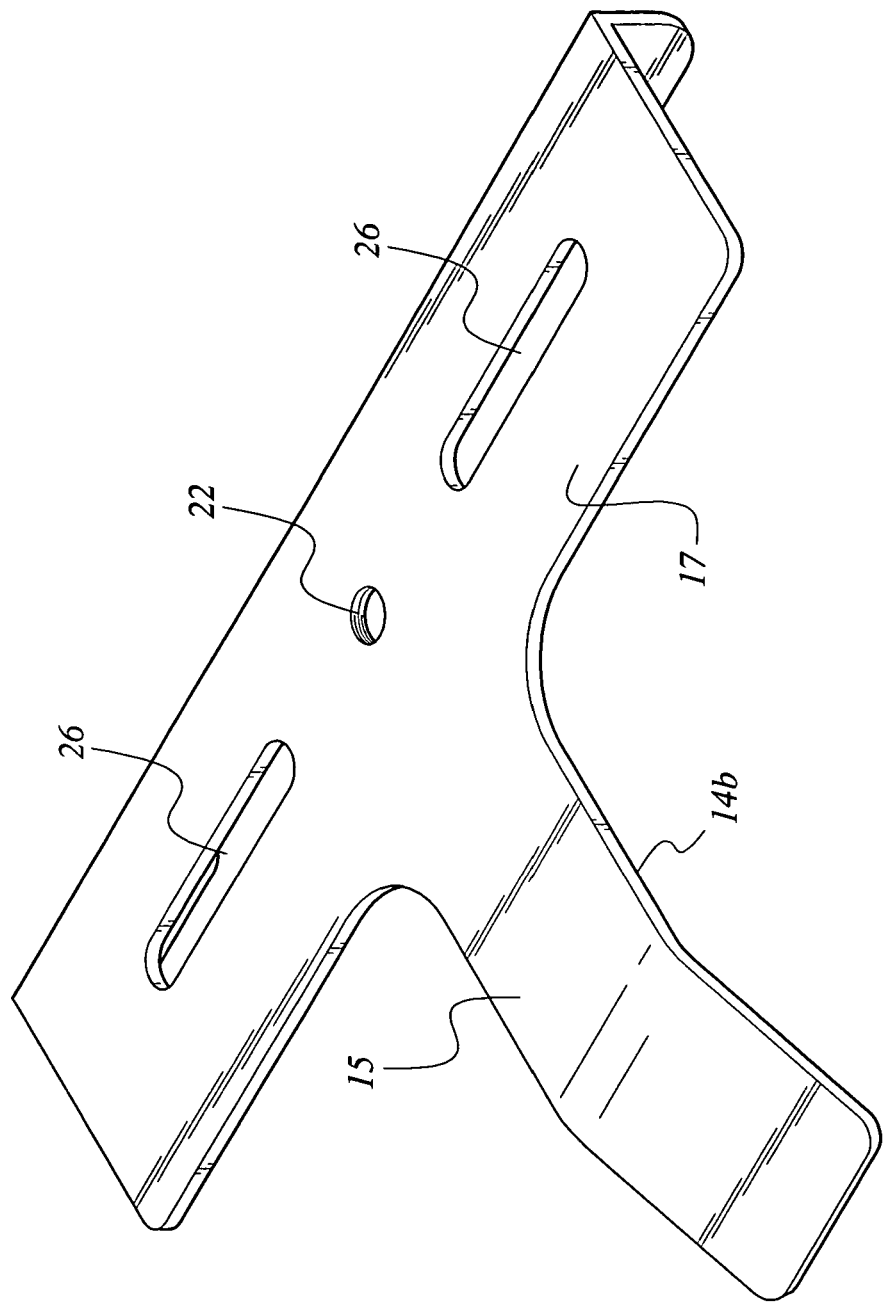
FIG. 3 is a perspective view of a second embodiment of a camera support base according to the present invention.
Figure 4:
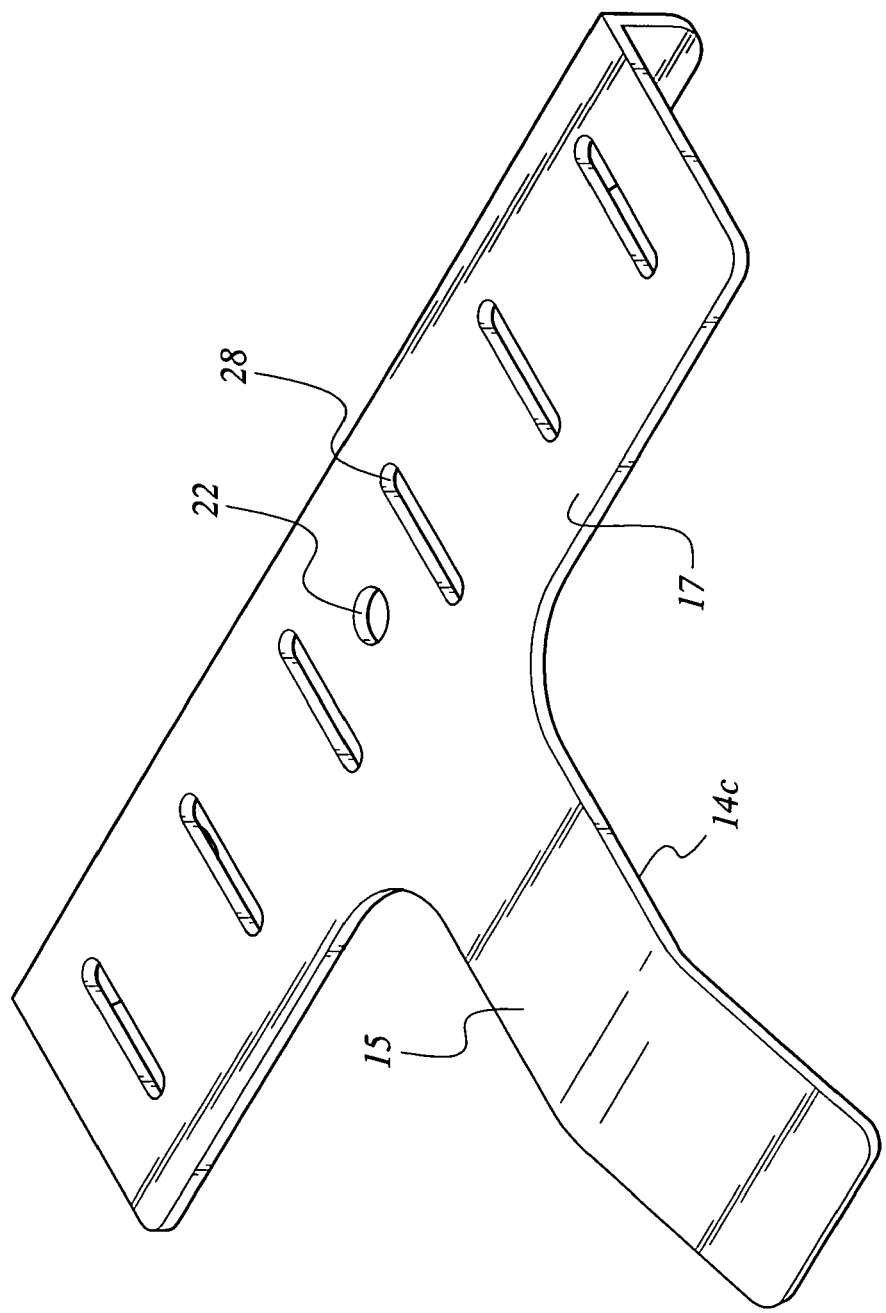
FIG. 4 is a perspective view of a third embodiment of a camera support base according to the present invention.

Referring to FIGS. 3 and 4, camera support bases 14b and 14c, respectively, of the present invention are illustrated with a central aperture 22 that may be threaded or unthreaded defined in cross member 17, and two opposing dispositions of open slots 26 and 28 parallel to each other (FIG. 4) and configured linearly (FIG. 3), respectively, on opposite sides of central aperture 22. The slots 26 and 28 provide further variations in the way a camera or a camera attachment can be attached to the camera support base. The slots 26 and 28 increase the population of cameras that can be attached to a camera support base.

Figure 5:
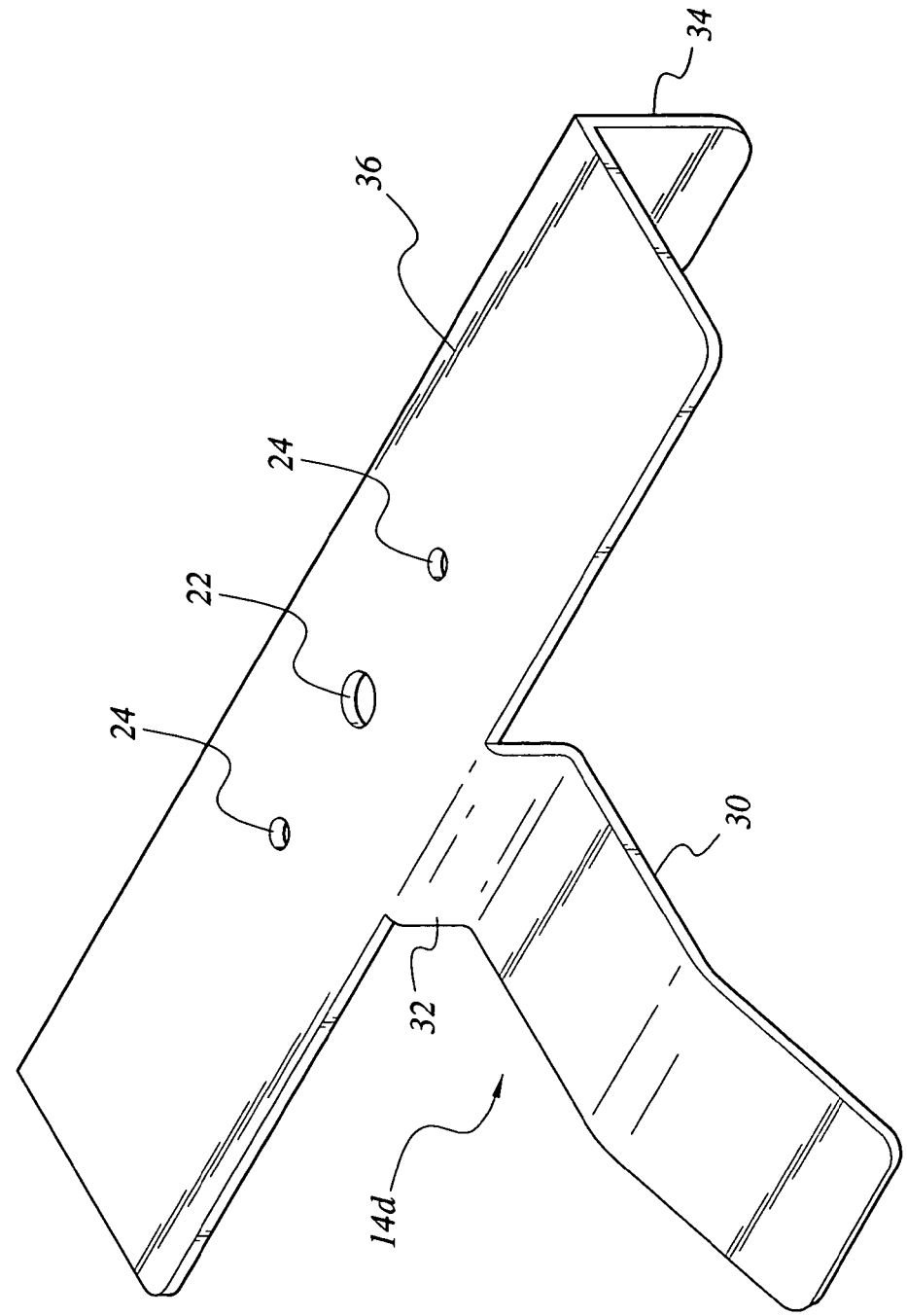
FIG. 5 is a perspective view of a fourth embodiment of a camera support base according to the present invention.

Referring to FIG. 5, another embodiment of the camera support base of the present invention, designated 14d, is presented. In the T-shaped embodiments illustrated in the foregoing figures, the cross member 17 or plate of the "T" and the shaft 15 of the T intersect in, and are disposed within, the same plane consistent with the characterization of a "T". However, certain pieces of camera equipment, such as particular and popular flash brackets, do not fit on the T shaped mode of the present invention. FIG. 5 illustrates an embodiment of the present invention that can accommodate larger pieces of camera equipment and support the pieces in a safe and secure manner. As shown in FIG. 5, the camera support base 14d of this embodiment incorporates a vertical perpendicular step riser 32 piece whose top section is connected to the midsection trailing edge of the flat cross section member 36. The bottom side section of the vertical riser 32 connects with the leading edge of the flat shaft 30 so that the cross section member 36 and the shaft 30 are offset from each other in separate, substantially parallel planes. The step riser 32 is less than three inches in height, but at least one-quarter inch in height.

The end portion of the shaft 30 is biased to provide a foot or support for the base 14d, which also includes support member 34 and an opposing support member at the trailing edge of the plate 36. The plate 36 itself may contain apertures 22, 24 and/or slots, as in the prior figures, to connect a camera or other equipment to the plate or cross member 36.

Figure 6:
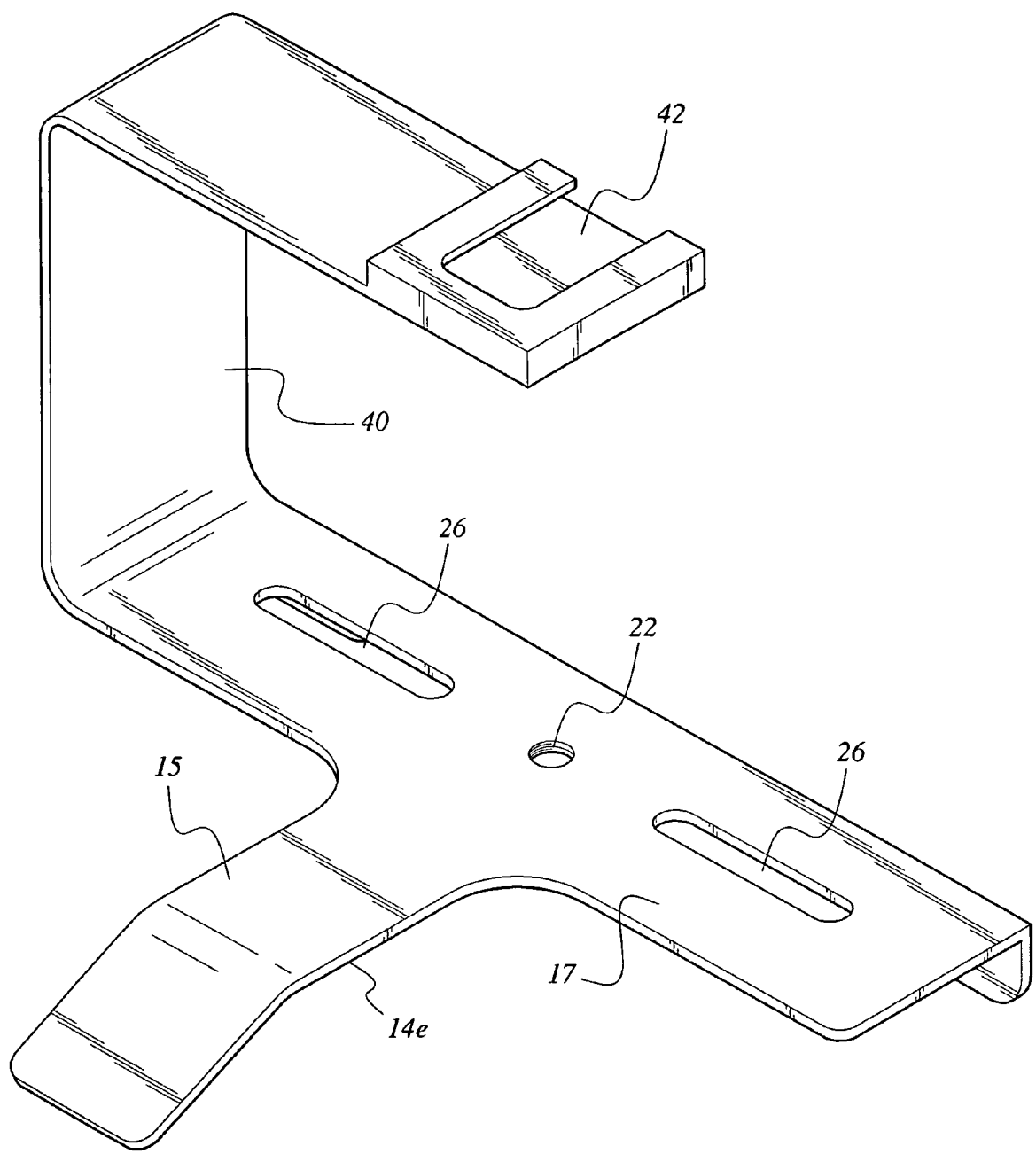
FIG. 6 is a perspective view of a fifth embodiment of a camera support base according to the present invention.

Another alternative embodiment of the invention, designated as 14e, is shown in FIG. 6, in which an L-shaped camera accessory support bracket 40 extends outward and upward from one end of the cross member 17. The top portion of the camera accessory support bracket 40 may have any type of photography accessory attachment device for holding different types of equipment. FIG. 6 shows a common representative hot-shoe 42 attachment mechanism that integrates with most photography flash equipment and other accessories. This attachment mechanism may have wiring integral with the camera support base apparatus to connect to a flash synchronization circuit of the camera attached to the camera support base 14e.

It is to be understood that the present invention is not limited to the embodiments described above, but encompasses any and all embodiments within the scope of the following claims.

I claim:

1. A camera support base, comprising:
    a flat, T-shaped body having a cross member and a flat shaft extending from the cross member, the cross member having at least one aperture defined therein adapted for attaching a camera to the T-shaped body;
    at least one leg depending from the cross member and at least one leg depending from the shaft for raising the T-shaped body above a supporting surface, the cross member having a substantially planar contour and defining a first plane, the shaft having a substantially planar contour and defining a second plane, the first plane being parallel to the second plane, the at least one leg depending from the shaft having a substantially planar contour and being angled downwardly with respect to the shaft, the cross member, the shaft and the at least one leg depending from the shaft being formed as a unitary, one-piece body.

2. The camera support base of claim 1, wherein said at least one leg depending from the cross member comprises a pair of rear legs extending orthogonal to a rear edge of the cross member, the legs being disposed at opposite ends of the cross member.

3. The camera support base of claim 1, wherein said at least one aperture comprises at least one threaded aperture disposed centrally in the cross member.

4. The camera support base of claim 1, wherein the at least one aperture includes at least two slots aligned linearly.

5. The camera support base of claim 1, wherein the at least one aperture includes at least two slots disposed in parallel to each other.

6. The camera support base of claim 1, wherein said T-shaped body and said legs are formed from a monolithic plate made from a material selected from the group consisting of aluminum and injection-molded plastic.

7. The camera support base of claim 1, further including:
    an L-shaped accessory support arm integral with and extending from the peripheral edge of said cross member; and an accessory attachment mechanism on an uppermost portion of the accessory support arm adapted for attaching removable camera accessories thereto.

8. A camera support base, comprising:

a flat, elongated cross member;

a flat, elongated shaft;

a riser plate attaching the shaft to the cross member, the riser extending normal to the cross member and normal to the shaft, the cross member and the shaft forming a T-shaped body in plan view, the cross member having at least one aperture defined therein adapted for attaching a camera thereto; and at least one leg depending from the cross member and at least one leg depending from the shaft for raising the T-shaped body above a supporting surface, the cross member having a substantially planar contour and defining a first plane, the shaft having a substantially planar contour and defining a second plane, the first plane being parallel to the second plane, the at least one leg depending from the shaft having a substantially planar contour and being angled downwardly with respect to the shaft, the cross member, the shaft and the at least one leg depending from the shaft being formed as a unitary, one-piece body.

9. The camera support base of claim 8, wherein the riser plate is less than three inches in height.

10. The camera support base of claim 8, wherein said at least one leg depending from the cross member comprises a pair of rear legs extending orthogonal to a rear edge of the cross member, the legs being disposed at opposite ends of the cross member.

11. The camera support base of claim 8, wherein said at least one aperture comprises at least one threaded aperture disposed centrally in the cross member.

12. The camera support base of claim 8, wherein the at least one aperture includes at least two slots aligned linearly.

13. The camera support base of claim 8, wherein the at least one aperture includes at least two slots disposed in parallel to each other.

14. The camera support base of claim 8, wherein said T-shaped body, said riser plate, and said legs are formed from a monolithic plate made from a material selected from the group consisting of aluminum and injection-molded plastic.

15. The camera support base of claim 8, further including:

an L-shaped accessory support arm integral with and extending from the peripheral edge of said cross member; and an accessory attachment mechanism on an uppermost portion of the accessory support arm adapted for attaching removable camera accessories thereto.

16. A camera support base, comprising:

a T-shaped body having a flat cross member and a flat shaft extending normal to the cross member, the cross member having at least one aperture defined therein adapted for attaching a camera to the T-shaped body;

at least one rear leg extending orthogonal to a rear edge of the cross member; and a front leg extending from the flat shaft, the cross member having a substantially planar contour and defining a first plane, the shaft having a substantially planar contour and defining a second plane, the first plane being parallel to the second plane, the front leg extending from the shaft having a substantially planar contour and being angled downwardly with respect to the shaft at an angle of approximately 45°, the cross member, the shaft and the front leg extending from the shaft being formed as a unitary, one-piece body.

17. The camera support base according to claim 16, further comprising a riser plate extending normal to and connecting edges of said cross member and said shaft, whereby said cross member and said shaft are disposed in parallel planes.

18. The camera support base according to claim 16, further comprising:

an L-shaped camera accessory support arm extending from an edge of said cross member, the arm defining a cantilevered accessory support plate disposed above said cross member; and a hot shoe camera attachment fitting attached to the cantilevered plate adapted for attaching a camera accessory to the cantilevered plate.

19. The camera support base according to claim 16, wherein the front leg has a substantially linear front edge for supporting the front leg on a flat support surface.

* * * * *